United States Patent [19]

Tsutsui et al.

[11] Patent Number: 4,726,855
[45] Date of Patent: Feb. 23, 1988

[54] METHOD OF ANNEALING A CORE

[75] Inventors: Kenzo Tsutsui, Yokkaichi; Tatsuo Ito, Mie; Takahiro Kawasaki, Mie; Kazuo Yamada, Mie, all of Japan

[73] Assignee: Kabushiki Kaisha Toshiba, Kawasaki, Japan

[21] Appl. No.: 930,036

[22] Filed: Nov. 12, 1986

Related U.S. Application Data

[63] Continuation of Ser. No. 707,711, Mar. 1, 1985, abandoned.

[30] Foreign Application Priority Data

Mar. 1, 1984 [JP] Japan .................................. 59-39506

[51] Int. Cl.⁴ .................................................. C21D 1/04
[52] U.S. Cl. ...................................... 148/108; 148/121
[58] Field of Search .................. 148/108, 121; 29/602, 29/605; 219/10.41, 10.43, 10.57, 10.75, 10.79

[56] References Cited

U.S. PATENT DOCUMENTS 3,716,763  2/1973  Houze, Jr. et al. ............. 317/157.5
4,355,221  10/1982  Lin .................................... 219/10.43

FOREIGN PATENT DOCUMENTS 58-77219  5/1983  Japan .................................. 148/121
58-77220  5/1985  Japan .

Primary Examiner—John P. Sheehan
Attorney, Agent, or Firm—Oblon, Fisher, Spivak, McClelland & Maier

[57] ABSTRACT

A method of annealing a core comprises the following steps. First annealing coils are wound around the legs or yokes of a core or parallel-arranged cores made of an amorphous magnetic alloy. Secondly, the core is excited by flowing an alternating current through the annealing coils. Thirdly, the core interior is uniformly heated to an annealing temperature of amorphous magnetic alloy plates by heat generated due to iron loss.

6 Claims, 7 Drawing Figures

F I G. 4
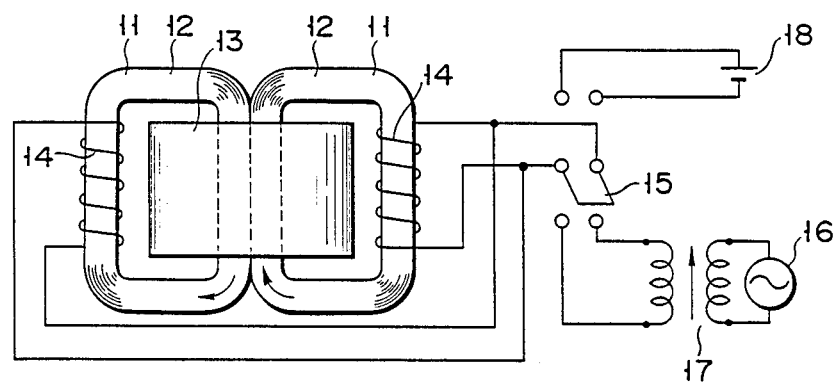
F I G. 5
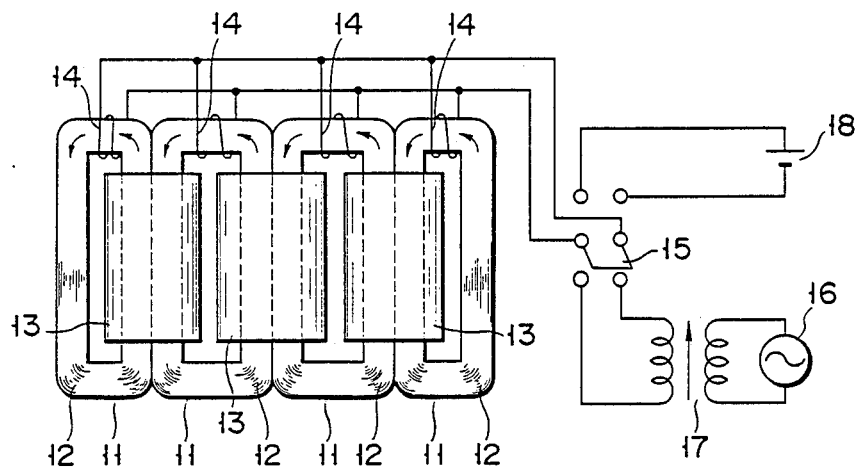

METHOD OF ANNEALING A CORE

This application is a continuation of application Ser. No. 707,411 filed Mar. 1, 1985, now abandoned.

BACKGROUND OF THE INVENTION

1. Field of the Invention

The present invention relates to a method of annealing a core of an amorphous magnetic alloy used for a transformer or the like.

2. Discussion of Background

The use of an amorphous magnetic alloy, which chiefly contain metals (Fe, Co, Ni) and semimetals (B, C, Si, P) and are rapidly quenched in a wound or laminated core of a transformer, has been studied. A plate made of this alloy has an iron loss ⅓ to ¼ that of a silicon steel plate, which is the conventional core material when no strain is present in the material. This alloy, therefore, has excellent magnetic characteristics.

However, since strain is produced in an amorphous magnetic alloy plate upon quenching, iron loss in this state is large and magnetic characteristics are thus considerably decreased. In order to obtain the original excellent characteristics, the amorphous magnetic alloy is annealed to remove strain after the core made of this alloy is assembled into a core, thus reducing iron loss.

A core consisting of an amorphous magnetic alloy is annealed with an electric heating source. Referring to FIG. 1, a wound core 1 consisting of an amorphous magnetic alloy 2 and a DC magnetic field generating coil 3 wound therearound is placed in a thermostat chamber 4 in which an inert gas is sealed so as to prevent oxidation of the core. Then, temperature of the interior of the chamber 4 is raised to a predetermined value upon flowing a DC current in the coil 3 from a DC power source (or battery) 5. Thus, the core 1 is heated to an annealing temperature and is maintained at this temperature for a predetermined period of time. Thereafter, the heater is turned off, and the core 1 is cooled while applying a DC magnetic field thereto. In this manner, annealing of the core 1 is completed.

The annealing temperature and time vary in accordance with amorphous magnetic alloy materials. For example, in METGLAS2605S2 (chemical composition: $Fe_{78}B_{13}Si_9$) available from Allied Corporation and considered the best transformer core material, the annealing temperature is selected to be 390° C. to 410° C. and time is approximately 2 hours. Thus, the annealing temperature range is fairly narrow, i.e., 400° C.±10° C. Other amorphous magnetic alloy materials also have a narrow annealing temperature range. However, in the above conventional method, since the core 1 is externally heated by radiation, heat at the outer surface of the core 1 cannot be sufficiently transmitted to the interior thereof with the result that the temperature distribution in the core is nonuniform. Therefore, it is difficult to maintain the temperatures both at the outer surface and in the core within the cited narrow range at the same time. For this reason, thermal stress arising from a temperature difference occurs in the plates 2 of the core 1 and degrades the magnetic characteristics.

SUMMARY OF THE INVENTION

It is an object of the present invention to provide a method of annealing a core wherein the internal core temperature of an amorphous magnetic alloy can be increased to a uniform annealing temperature so that excellent magnetic characteristics can be imparted to the amorphous magnetic alloy.

An annealing method of a core according to the present invention is performed in the following manner. An annealing coil is wound around a core made of an amorphous magnetic alloy. An AC current is flowed in the coil to excite the core, and the interior of the core is uniformly raised to an annealing temperature of the amorphous magnetic alloy by Joule heat generated by iron loss of the core. With this method, the availability of uniform increase of the internal temperature of the core to the annealing temperature improves the magnetic characteristics of the core. Since the core is not externally heated, the insulation of a transformer coil is not damaged even if the transformer coil is wound around the core. In this case, the transformer coil is wound around the core before annealing. Thus, a large external force is not applied to the core by winding it after annealing.

BRIEF DESCRIPTION OF THE DRAWINGS

This invention can be fully understood from the following detailed description with reference to the accompanying drawings, in which:

FIG. 4 is a schematic view of an annealing method of the core according to a first embodiment of the present invention;

FIG. 5 is a schematic view of an annealing method of the core according to another embodiment of the present invention;

DETAILED DESCRIPTION OF THE PREFERRED EMBODIMENTS

The present invention will be described hereinafter using METGLAS2605S2 available from Allied Corporation described above as an amorphous magnetic alloy. However, the amorphous magnetic alloy is not limited to the above, and other appropriate materials can be used.

Assuming that the total heat generated due to iron loss of a core is accumulated in the core, the following equation can be established:

$$Q = CM(T_1 - T_2) \tag{1}$$

where
  Q: heat required for annealing the core (kcal)
  C: specific heat of the amorphous magnetic alloy plate (kcal/kg °C.)
  M: weight of the core (kg)
  T1: annealing temperature (°C.)
  T2: room temperature (given as 20° C.)

According to equation (1), when 1 kg of the amorphous magnetic alloy of Allied Corporation having a specific heat of 0.11 kcal/kg.° C. is used, the heat Q required for raising its temperature to the annealing temperature of 400° C. is 41.8 kcal. This value corresponds to 48.6 W.h. For this reason, in order for the temperature of the core to be raised to the annealing temperature of 400° C. in the same manner as in the conventional annealing method using a thermostat chamber, an iron loss of 25 W/kg is needed.

Figure 2:
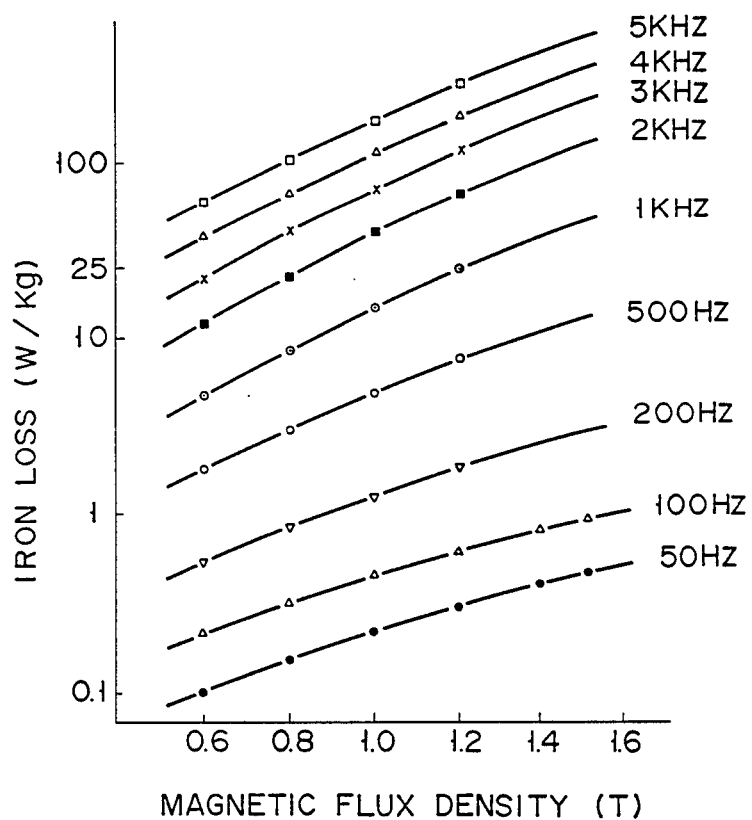
FIG. 2 is a graph showing the relationship between iron loss and a magnetic flux density with respect to frequencies of alternating currents flowing in a core made of an amorphous magnetic alloy as a parameter.

According to experimental data shown in FIG. 2, when frequencies of AC currents flowing in the annealing coil are respectively set at 1 kHz, 2 kHz, 3 kHz and 4 kHz under the condition in which time required for raising a room temperature to the annealing temperature takes 2 hours, magnetic fluxes generated in the core are 1.2 T (tesla), 1.0 T, 0.8 T and 0.6 T. Therefore, when the magnetic flux is 1.0 T, the frequency of the AC current can be set at 2 kHz in order to raise the temperature of the core made of the amorphous magnetic alloy to 400° C. within 2 hours.

Figure 1:
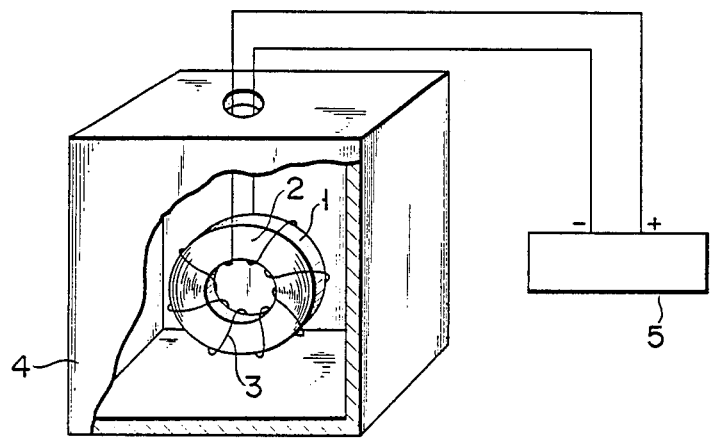
FIG. 1 is a schematic view of a conventional method of annealing a core.
Figure 3:
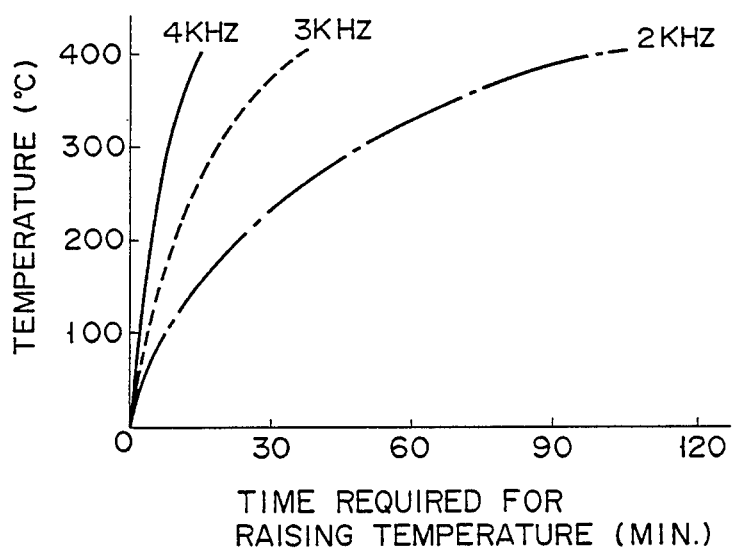
FIG. 3 is a graph showing the relationship between a core temperature and time with respect to frequencies of alternating currents flowing in a core made of the amorphous magnetic alloy as a parameter.

As shown in FIG. 3, time required for raising the core temperature to the annealing temperature of 400° C. was experimentally obtained when the magnetic flux thereof was at 1.0 T. According to this experiment, it required about 100 minutes at a frequency of 2 kHz. At a frequency of 3 kHZ, it took about 40 minutes. Furthermore, at a frequency of 4 kHz, it took about 15 minutes.

From the above two experiments, even if a core made of the amorphous magnetic alloy having small iron loss is used, a magnetic flux density of 1.0 T is applied to the core and the core temperature can be raised to the annealing temperature by an AC current of 2 kHz or higher. In addition, time required for raising the core temperature to the annealing temperature can be easily altered by selecting the frequency of the AC current as needed.

However, in practice, the total generated heat cannot be accumulated in the core, and a portion thereof is radiated. Thus, the magnetic flux density and the AC current frequency must be selected in accordance with the radiation. Assuming a cubic core having the side length L, the heat generated in the core is proportional to the volume $L^3$ of the core, and the radiation from the core is proportional to the surface area $6 \times L^2$ of the core. It follows that, as the core size increases, the ratio of the radiation to the heat generated in the core reduces. Thus, the generated heat in the core is substantially equal to the heat Q accumulated in the core and the radiation can be ignored.

In the first embodiment of the annealing method of the core shown in FIG. 4, a pair of wound cores 11 made of the amorphous magnetic alloy 12 are arranged in series, and a transformer coil 13 is wound around two adjacent legs or yokes of the cores 11, i.e., inner legs thereof. Annealing coils 14 are wound around the respective outer legs of the wound cores. The coils 14 are temporary ones which are used only for annealing the cores 11 and are removed after the annealing. The coils 14 are selectively connected by a change switch 15 to a high frequency AC power source 16 and a DC power source 18 such that magnetic fluxes are applied to two adjacent inner legs of the wound cores 11 in opposite directions. A voltage of the AC power source 16 is adjusted by a voltage adjuster 17 such as a transformer.

When a current flows in the annealing coils 14, a voltage corresponding to their turn number is applied thereto. For this reason, the turn number of the coils 14 is selected in accordance with the insulation breakdown voltage of the coils. For example, when the sectional area S of the wound core 11 is 100 cm², the magnetic flux density Bm is 1.0 T, the frequency f is 2,000 Hz, and the applied maximum voltage is 1,000 V, the turn number N of the annealing coils 14 is about 12 which can be obtained from the following equation.

$$E = 4.44 \times f \times N \times Bm \times S \times 10^{-4}$$

Note that wires coated with an inorganic insulator having a high breakdown voltage and thermal resistance (e.g., wires coated with ceramics) can be used for the annealing coil 14.

From the experiment, the magnetizing force, which applied 1.0 T of the magnetic flux B to the unannealed wound core 11 having a sectional area of 100 cm², is about 350 AT/m. When the magnetic path of the wound core is 1 m, the exciting current is about 29 A.

As apparent from the above description, the turn number and the current of the annealing coil 14 can be arbitrarily determined in accordance with the size, frequency, applied voltage, and length of the magnetic path of the wound core 11.

The operation of the embodiment shown in FIG. 4 will be described hereinafter. The annealing coils 14 are connected to the high frequency AC power source 16 by the switch 15. The voltage of the power source 16 is adjusted to a predetermined value by the voltage adjuster 17, and the frequency of an AC current is selected to be 2 kHz or higher. The wound cores 11 are excited by the AC currents flowing through the annealing coils 14. Then, eddy currents flow in the coils 14, thus generating Joule heat due to iron loss in the wound cores 11. For this reason, the interior of each core 11 is uniformly heated and its temperature is raised. When the temperature of the inner portion of each core 11 reaches the annealing temperature of the amorphous magnetic alloy 12, i.e., 400° C., the voltage from the power source 16 is adjusted by the adjuster 17 to maintain the temperature of the cores 11 at 400° C. for a desired period of time, e.g., 30 minutes to 2 hours. Since the magnetic fluxes in the two adjacent legs of the two cores 11 are directed opposite to each other, a voltage is not induced in the transformer coil 13.

After the cores 14 have been heated for the period of time as mentioned above, the annealing coils 14 are connected to the DC power source 18 by the change of the switch 15 and the wound cores 11 begin to be cooled with a DC magnetic field formed in the cores 11.

Thus, the lower temperature of the outer atmosphere around the cores 11 than that of their interior allows the cores 11 to be more rapidly cooled than with the conventional method, even if they are large.

After the cores 11 have been cooled, the annealing coils 14 are removed from the cores 11, thus to complete the annealing of the wound cores 11.

In order to prevent oxidation of the cores 11 during the process, annealing is preferably performed in the atmosphere containing an inert gas, i.e., nitrogen gas.

FIG. 5 shows an embodiment for annealing a 3-phase 5-leg wound core.

Figure 6:
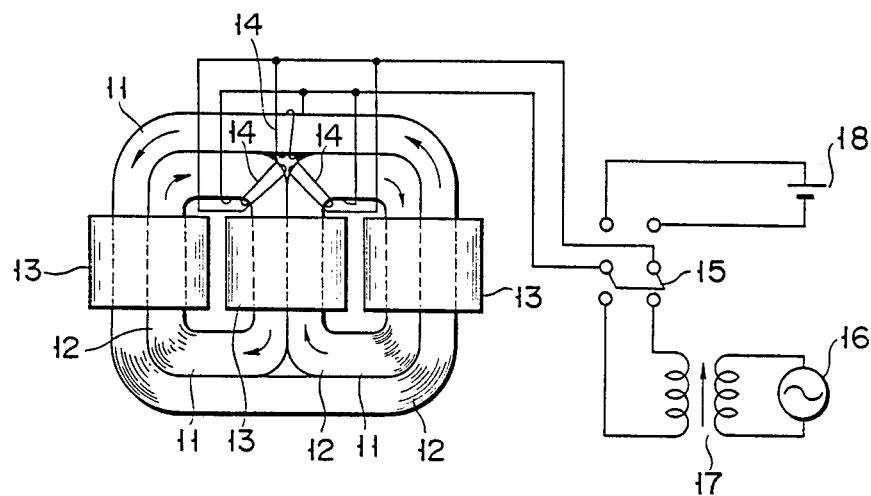
FIG. 6 is a schematic view of an annealing method of the core according to a further embodiment of the present invention.
Figure 7:
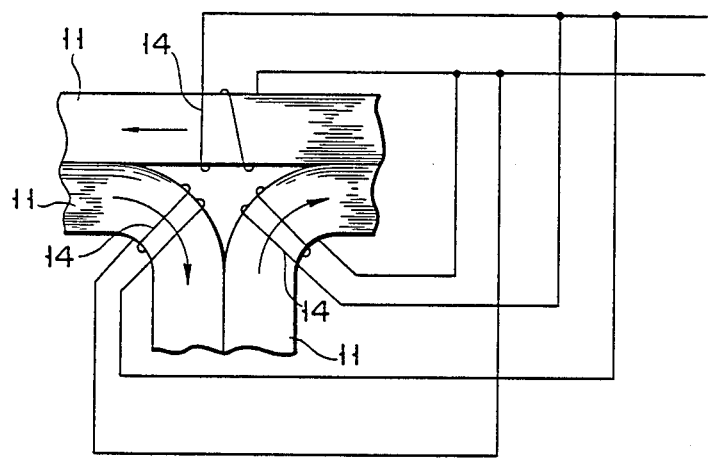
FIG. 7 is a enlarged view of the main portion of FIG. 6, in which the core temporary coils are wound around the core.

FIGS. 6 and 7 show an embodiment for annealing a 3-phase wound core, respectively.

In both embodiments, transformer coils 13 are first wound around the adjacent legs of the paired wound core 11, and temporary wound coils 14 are wound around the corresponding cores 11. The coils 14 are selectively connected to the AC power source 16 and the DC power source 18 such that the directions of the magnetic fluxes are opposite to each other in the adjacent legs of the paired core 11 which extends through the transformer coils 13. Note that a frequency, a current, the turn number of the annealing coil and an operation are the same as those of the embodiments in FIG. 3.

In the above embodiments, the temperature distribution in the interior and on the surfaces of the wound cores can be kept uniform. For this reason, thermal stress will not substantially occur, and degradation of magnetic characteristics can be prevented. Since outer atmosphere of the wound cores are not heated, the transformer coils will not be damaged upon annealing. Furthermore, since the transformer coils need not be wound around the wound cores after annealing, the wound cores will not be damaged by such winding.

In the third embodiment, the temporary wound coils are used as the annealing coils but transformer coils can also be used if the transformer has a low voltage. However, since a transformer with a high voltage has many turns, transformer coils cannot be used for annealing because the desired magnetic flux density cannot be obtained or because insulating breakdown may occur.

When cooling the wound core, while applying a DC magnetic field, transformer coils can be used in place of temporary wound coils.

The annealing method of the present invention, as described for a wound core, can also be applied to a laminated core made of an amorphous magnetic alloy.

What is claimed is:

1. A method of annealing cores, comprising the steps of:
    arranging cores having legs and yokes in series and made an an amorphous magnetic alloy, and winding a transformer coil around each pair of adjacent ones of said legs of each pair of adjacent ones of said cores;
    winding annealing coils around one of said legs or one of said yokes of each of said cores; and
    passing an alternating current of not less than 2 kHz through said annealing coils, to generate magnetic fluxes which circulate around each of said cores, for producing iron loss in said cores such that the interior of said cores is uniformly heated to an annealing temperature of said amorphous magnetic alloy.

2. A method according to claim 1, wherein said annealing coils are temporarily wound coils.

3. A method according to claim 2, wherein a transformer coil is wound around two adjacent legs or yokes of said cores, and said alternating currents flow in the temporarily wound coils so that opposite magnetic fluxes are generated in said two adjacent legs or yokes.

4. A method according to claim 1, wherein said annealing coils are transformer coils.

5. A method according to claim 1, wherein each of said cores is a wound core.

6. A method according to claim 1, wherein each of said cores is a laminated core.

* * * * *

UNITED STATES PATENT AND TRADEMARK OFFICE
CERTIFICATE OF CORRECTION

PATENT NO. : 4,726,855

DATED : February 23, 1988

INVENTOR(S) : Kenzo Tsutsui, et al.

It is certified that error appears in the above-identified patent and that said Letters Patent is hereby corrected as shown below:

ON THE TITLE PAGE:
  In the Related U.S. Application Data, "Continuation of Ser. No. 707,711" should be corrected to read --Continuation of Ser. No. 707,411--.

Signed and Sealed this

Sixteenth Day of August, 1988

Attest:

DONALD J. QUIGG

Attesting Officer

Commissioner of Patents and Trademarks